US012781917B2

(12) United States Patent
Huang

(10) Patent No.: US 12,781,917 B2
(45) Date of Patent: Nov. 3, 2026

(54) SAFETY MODULE FOR PROCESSING MACHINE

(71) Applicant: DURQ MACHINERY CORP., Taichung City (TW)

(72) Inventor: Yu-Chia Huang, Taichung City (TW)

(73) Assignee: DURQ MACHINERY CORP., Taichung City (TW)

( * ) Notice: Subject to any disclaimer, the term of this patent is extended or adjusted under 35 U.S.C. 154(b) by 0 days.

(21) Appl. No.: 19/237,486

(22) Filed: Jun. 13, 2025

(65) Prior Publication Data

US 2025/0306563 A1 Oct. 2, 2025

Related U.S. Application Data

(62) Division of application No. 18/673,822, filed on May 24, 2024, now Pat. No. 12,585,239.

(30) Foreign Application Priority Data

Mar. 12, 2024 (TW) ................................ 113109049

(51) Int. Cl.
*F16P 3/14* (2006.01)
*F16P 3/00* (2006.01)
(Continued)

(52) U.S. Cl.
CPC ................. *F16P 3/142* (2013.01); *F16P 3/00* (2013.01); *F16P 3/12* (2013.01); *G05B 19/406* (2013.01);
(Continued)

(58) Field of Classification Search
CPC ..... F16P 3/142; F16P 3/00; F16P 3/12; G05B 19/406; G05B 2219/50193;
(Continued)

(56) References Cited

U.S. PATENT DOCUMENTS

| | | | | |
|---|---|---|---|---|
| 7,924,817 | B2 | 4/2011 | Ohno et al. | |
| 11,629,817 | B1 | 4/2023 | Bae et al. | |
| 2019/0377322 | A1* | 12/2019 | Hornung .................... | G06T 7/80 |

FOREIGN PATENT DOCUMENTS

| | | | | | |
|---|---|---|---|---|---|
| EP | 4557240 | A1 * | 5/2025 | .............. | F16P 3/142 |
| WO | WO-2024099929 | A1 * | 5/2024 | .............. | F16P 3/141 |

* cited by examiner

*Primary Examiner* — Daniel Cavallari
(74) *Attorney, Agent, or Firm* — MUNCY, GEISSLER, OLDS & LOWE, P.C.

(57) ABSTRACT

A safety module, which is applied to a processing machine including a processing member and a power source connected with the processing member, includes a visual element, a brake and a controller. The visual element defines safety and danger zones for the processing scope of the processing member. The brake is connected with the power source for providing a brake effect to the power source. The controller is connected with the power source, the visual element and the brake. When capturing that an object is located in the danger zone or determining that an object is about to enter the danger zone according to the movement trajectory of the object, the visual element transmits a brake signal to the controller to make the controller drive the brake to control the power source to stop operating. The safety module improves the safety of the operator operating the processing machine.

4 Claims, 7 Drawing Sheets

(51) Int. Cl.
*F16P 3/12* (2006.01)
*G05B 19/406* (2006.01)
*B23Q 11/00* (2006.01)
*B27G 19/00* (2006.01)
*G06V 20/52* (2022.01)

(52) U.S. Cl.
CPC ........ *B23Q 11/0082* (2013.01); *B27G 19/008* (2024.05); *G05B 2219/50193* (2013.01); *G06V 20/52* (2022.01); *Y10S 83/01* (2013.01); *Y10S 408/71* (2013.01)

(58) Field of Classification Search
CPC .. B23Q 11/0082; B27G 19/008; G06V 20/52; Y10S 83/01; Y10S 408/71
See application file for complete search history.

SAFETY MODULE FOR PROCESSING MACHINE

CROSS REFERENCE TO RELATED APPLICATIONS

This application is a Divisional of co-pending application Ser. No. 18/673,822, filed on May 24, 2024, and for which priority is claimed under 35 U.S.C. § 120; and this application claims priority of Application No. 113109049 filed in Taiwan on Mar. 12, 2024 under 35 U.S.C. § 119, the entire contents of all of which are hereby incorporated by reference.

BACKGROUND OF THE INVENTION

1. Field of the Invention

The present invention relates to processing machines and more particularly, to a safety module for a processing machine.

2. Description of the Related Art

Since sawing tools are liable to cause harm to operators during operation, related industries constantly improve safety mechanisms to improve the safety protection of operators. For example, U.S. Pat. No. 11,629,817B1 disclosed a safety device which uses an artificial intelligence-based analysis to judge work images/videos captured during turning, milling and other machining using chucks or cutters. When a part of a worker's body is present in the danger zone outside the safety zone, an alarm is triggered. Besides, U.S. Pat. No. 7,924,817B2 disclosed a sensing system for sensing pre-selected colors within one or more monitoring areas of the machine tool. If the operator wears red gloves, the sensing system can take action according to the position the red gloves are sensed, such as sounding the horn, turning on the light, or discontinuing the machine tool.

SUMMARY OF THE INVENTION

It is a primary objective of the present invention to provide a safety module for a processing machine, which can improve the safety of the operator when the operator operates the processing machine.

To attain the above primary objective, a safety module of a first embodiment provided by the present invention includes a visual element, a brake, and a controller. The visual element defines a safety zone and a danger zone for the processing scope of a processing member of the processing machine. The brake is connected with a power source of the processing machine for providing a brake effect to the power source. The controller is connected with the power source, the visual element and the brake for receiving a signal sent by the visual element and driving the brake to perform a brake control to the power source according to the signal.

Before the operation starts, if a specific target is not recognized by the visual element yet, the controller controls the power source to stay off. When the specific target is recognized by the visual element, the visual element transmits a start signal to the controller to make the controller start the power source. In this way, the power source can be prevented from being started by mistake, thereby improving the operation safety. Besides, during the operation, when the visual element captures that an object, such as the hand of the user, is located in the danger zone, the visual element transmits a brake signal to the controller to make the controller drive the brake to control the power source to stop operating, so as to prevent the object from being cut by a saw blade, thereby improving the operation safety.

To attain the above primary objective, a safety module of a second embodiment provided by the present invention includes a visual element, a brake and a controller. The visual element defines a safety zone and a danger zone for the processing scope of a processing member of the processing machine. The brake is connected with a power source of the processing machine for providing a brake effect to the power source. The controller is connected with the power source, the visual element and the brake for receiving a signal sent by the visual element and driving the brake to perform a brake control to the power source according to the signal.

It can be known from the above description that when the visual element determines that an object, such as the hand of the user, is about to enter the danger zone according to the movement trajectory of the object, the visual element transmits a brake signal to the controller to make the controller drive the brake to control the power source to stop operating, so as to prevent the object from being cut by a saw blade, thereby improving the operation safety.

Preferably, when a specific target is recognized by the visual element, the visual element transmits a start signal to the controller to make the controller control the power source to start up.

Preferably, the specific target is a biometric or a non-biometric. The biometric may be the face or hand of the user. The non-biometric may be the saw blade or a card printed with identification symbols.

Preferably, when the visual element captures that the object is located in the safety zone, the visual element transmits an operate signal to the controller to make the controller control the power source to continue operating.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
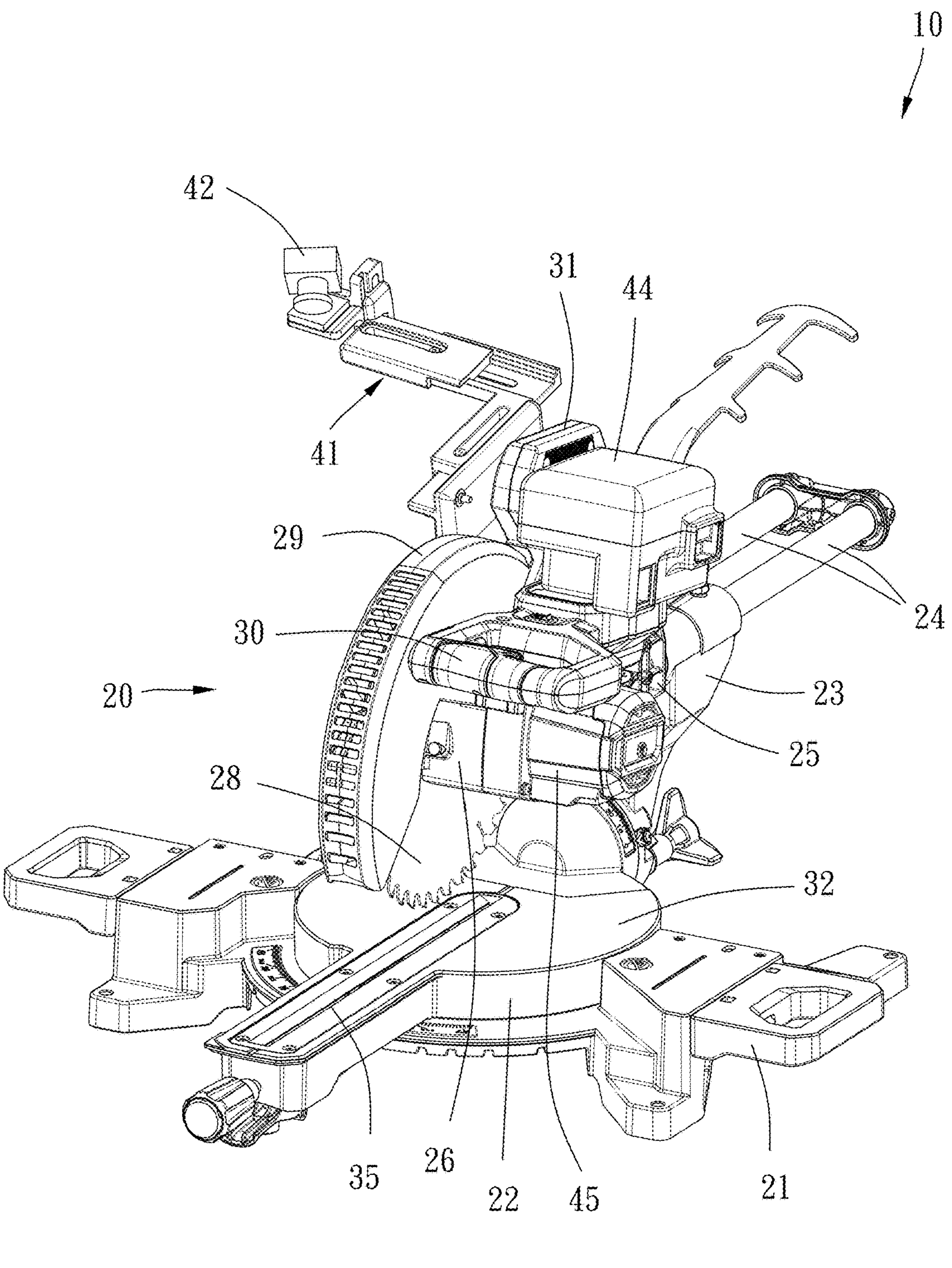
FIG. 1 is a perspective view of a sawing device of a first embodiment of the present invention.

First of all, it is to be mentioned that throughout this specification, including the following embodiments and claims, the directional terms are all based on the direction shown in the figures. Besides, same reference numerals used in the following embodiments and the appendix drawings designate same or similar elements or the structural features thereof.

Figure 2:
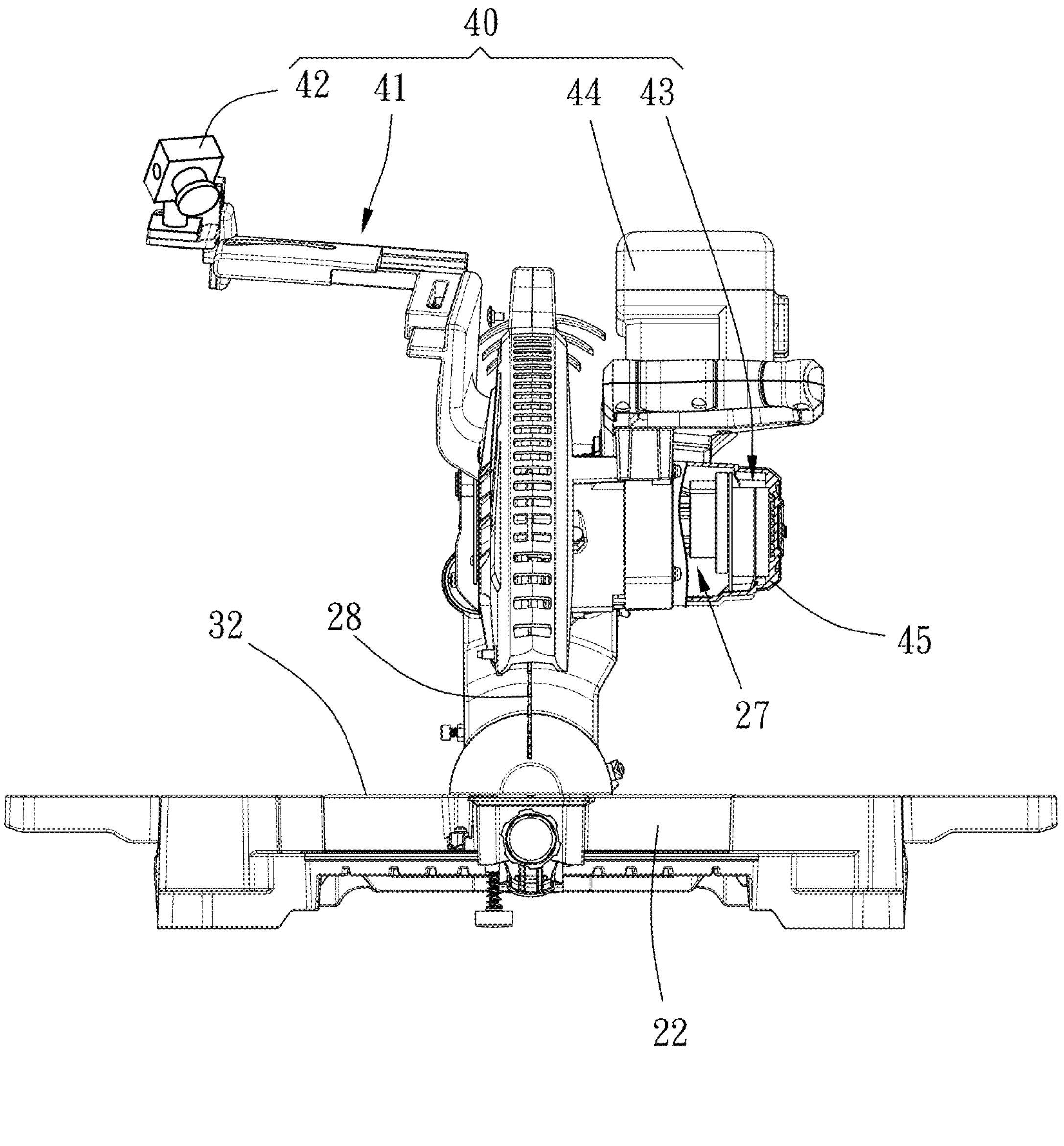
FIG. 2 is a front view of the sawing device of the first embodiment of the present invention.

Referring to FIG. 1 and FIG. 2, a processing machine 20 in coordination with a safety module 40 of the present invention is a sawing machine in this embodiment. The processing machine 20 shown in FIG. 1 has a base 21, a worktable 22, a guiding rod seat 23, two guiding rods 24, an angle seat 25, a saw blade box 26, a power source 27 (motor), a processing member 28 (saw blade), a protection cover 29, a grip 30, and a handle 31. The worktable 22 is rotatably disposed on the base 21, and has a work plane 32 and a saw groove 35 provided on the work plane 32. The work plane 32 is adapted to bear a workpiece (not shown). The guiding rod seat 23 is connected to the rear side of the worktable 22. The two guiding rods 24 are parallel to each other and inserted in the guiding rod seat 23 in a way that the guiding rods 24 are displaceable forward and backward relative to the worktable 22. The angle seat 25 is connected to the front end of the two guiding rods 24, thereby displaceable forward and backward along with the two guiding rods 24. The saw blade box 26 is pivotably disposed on the angle seat 25, so that the saw blade box 26 is pivotable upward and downward relative to the work plane 32 and also displaceable forward and backward along with the two guiding rods 24 through the angle seat 25. The power source 27 is disposed on a side of the saw blade box 26 by assembly for providing power. The processing member 28 is connected with the power source 27 and partially accommodated in the saw blade box 26, so that the processing member 28 can be driven by the power source 27 to operate and can be also driven by the saw blade box 26 to approach or leave the work plane 32. The protection cover 29 is pivotably disposed on the saw blade box 26, and covers the lower part of the processing member 28 when the processing member 28 is not in use, so as to prevent the processing member 28 from being exposed when not in use. The grip 30 is installed on the outer peripheral surface of the power source 27 for the user to conveniently drive the processing member 28 to approach or leave the work plane 32. The handle 31 is installed on the top surface of the saw blade box 26 for the user to conveniently lift the entire machine for transportation.

Figure 4:
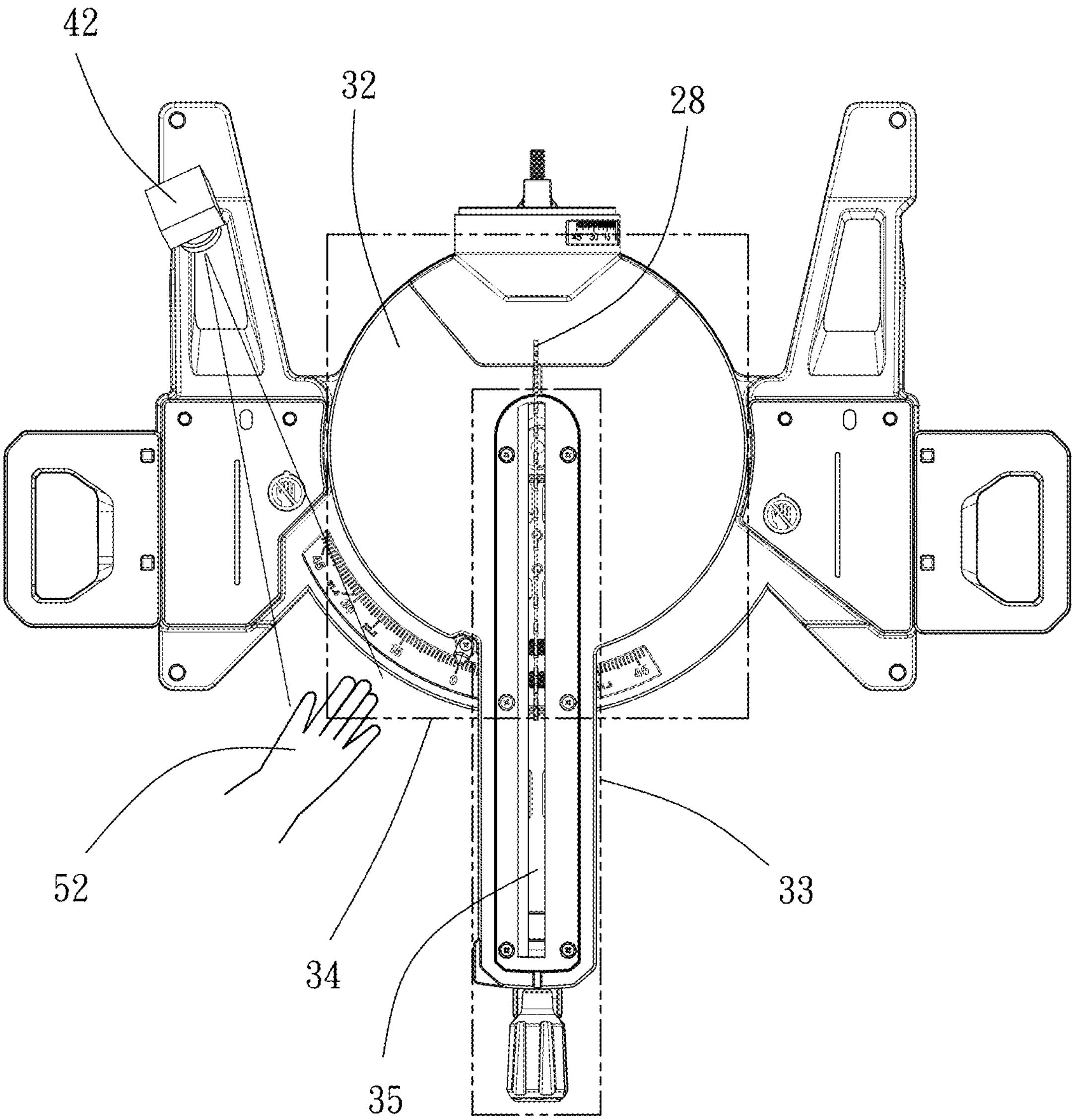
FIG. 4 is a top view of the sawing device of the first embodiment of the present invention, wherein partial elements are not shown, primarily illustrating that a hand is located in a safety zone.

Referring to FIG. 1 and FIG. 2, the safety module 40 of the first embodiment of the present invention has a supporting frame 41, a visual element 42, a brake 43, and a controller 44. The bottom end of the supporting frame 41 is disposed on a side of the handle 31 (or the saw blade box 26) by assembly. The top end of the supporting frame 41 extends above the worktable 22. The visual element 42 is installed on the top end of the supporting frame 41 and located above the worktable 22, and defines a danger zone 33 and a safety zone 34 for the work plane 32, as shown in FIG. 4. The safety zone 34 mentioned herein refers to the zone wherein being cut by the processing member 28 is improbable, and the danger zone 33 refers to the zone wherein being cut by the processing member 28 is possible. Because the saw blade 28 may have the movement of being pushed forward and being pushed inclinedly in practical operation, the visual element 42 in this embodiment defines the area of approximately 5 centimeters around the processing member 28 and the area of approximately 10 centimeters right in front of the saw blade 28 as the danger zone 33, and defines the positions outside the danger zone 33 as the safety zone 34. The brake 43, which is an electromagnetic brake in this embodiment, is disposed on the power source 27 by assembly. The brake 43 and the power source 27 are collectively covered by a shell 45. The brake 43 is adapted for performing a brake action to the power source 27. The controller 44 is installed on the top surface of the grip 30 and electrically connected with the power source 27, the visual element 42 and the brake 43, for receiving a signal sent by the visual element 42 and driving the brake 43 to brake the power source 27 according to the aforementioned signal to make the power source 27 stop operating.

Figure 3:
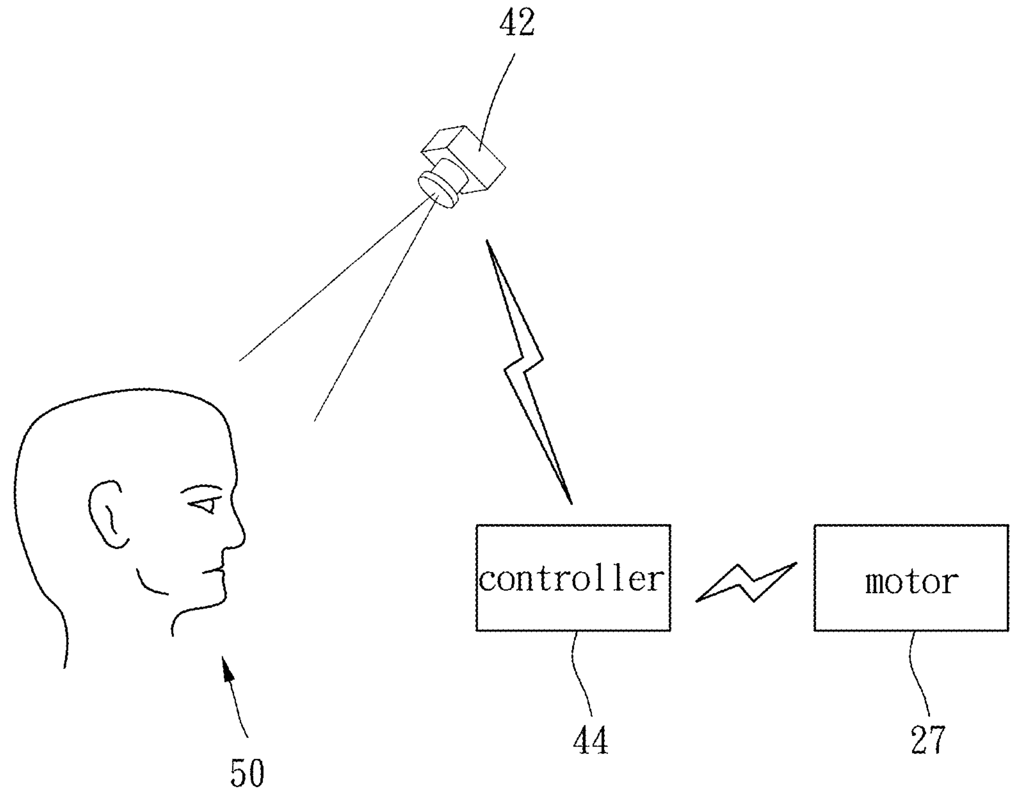
FIG. 3 is a block diagram of the sawing device of the first embodiment of the present invention, primarily illustrating that a visual element recognizes a specific target and then control a power source to start up through a controller.

Before the operation starts, as shown in FIG. 3, let the visual element 42 recognize a specific target 50 at first. At this time, the visual element 42 transmits a start signal to the controller 44 to make the controller 44 control the power source 27 to start up. The aforementioned specific target 50 can be a biometric, such as the face of the user, or a non-biometric, such as the processing member 28 or a card printed with identification symbols like QR code, that is unlimited herein. That means when the aforementioned specific target 50 is not recognized by the visual element 42, the power source 27 cannot start up. Once the aforementioned specific target 50 is recognized by the visual element 42, the power source 27 can start up. In this way, the power source 27 can be prevented from being started by mistake, thereby improving the operation safety.

Figure 5:
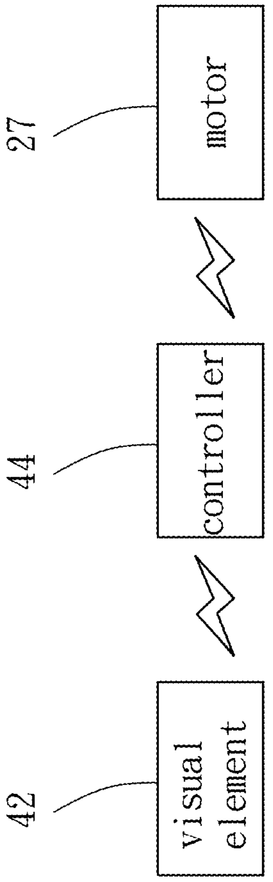
FIG. 5 is a block diagram of the sawing device of the first embodiment of the present invention, primarily illustrating that the controller controls the power source to operate according to the signal of the visual element.
Figure 7:
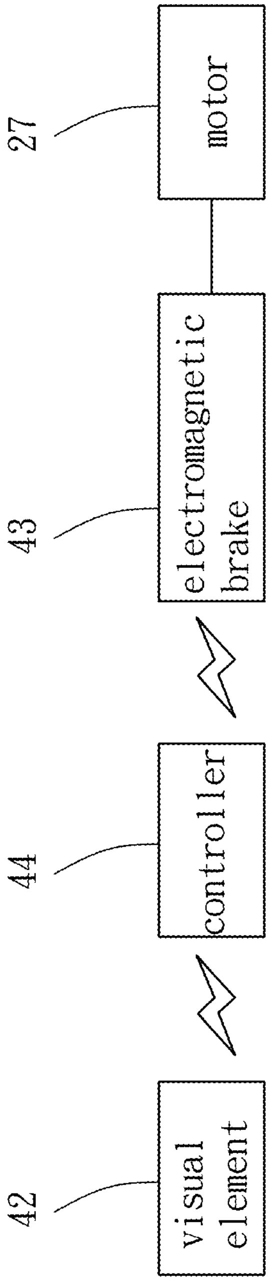
FIG. 7 is similar to FIG. 5, primarily illustrating that the controller controls a brake to brake the power source according to the signal of the visual element.
Figure 6:
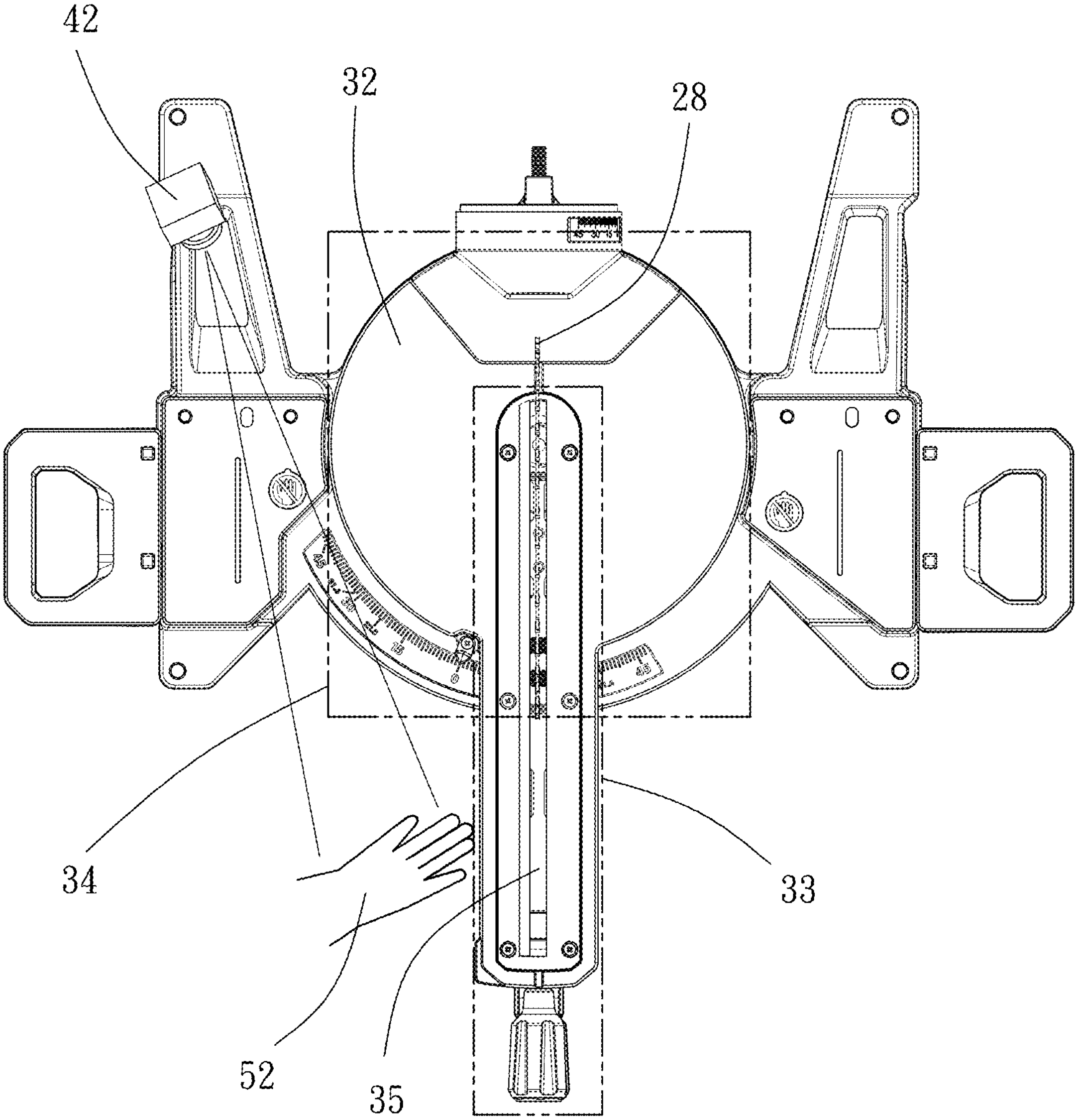
FIG. 6 is similar to FIG. 4, primarily illustrating that the hand is located in a danger zone.

During the operation, as shown in FIG. 4, when the visual element 42 captures that an object 52, such as the hand of the user, is located in the safety zone 34, the visual element 42 transmits an operate signal to the controller 44 to make the controller 44 control the power source 27 to continue operating, as shown in FIG. 5, thereby allowing the processing member 28 to perform a sawing process to a workpiece. Once the visual element 42 captures that the aforementioned object 52 leaves the safety zone 34 or enters the danger zone 33, as shown in FIG. 6, the visual element 42 transmits a brake signal to the controller 44, as shown in FIG. 7. The controller 44 then controls the brake 43 to perform a brake control to the power source 27 to make the power source 27 stop operating right away, so as to prevent the aforementioned object 52 from being cut by the processing member 28.

Figure 8:
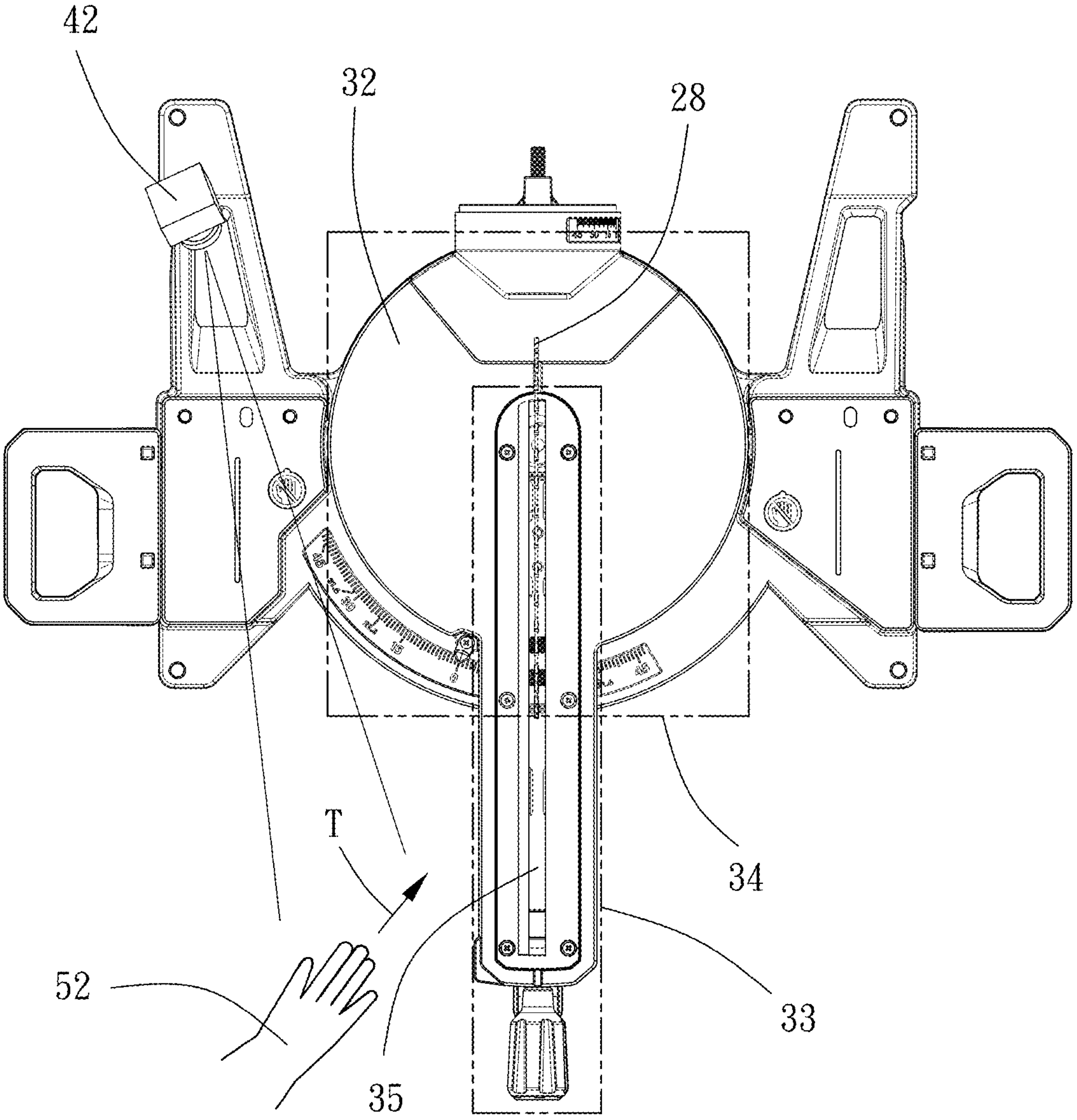
FIG. 8 is a top view of a sawing device of a second embodiment of the present invention, wherein partial elements are not shown, primarily illustrating that the visual element judges whether the movement trajectory of the hand will enter the danger zone.

On the other hand, the logic of the visual element 42 judging the object 52 entering the danger zone 33 can have variations, unlimited to sending the brake signal to the controller 44 only after the object 52 enters the danger zone 33. In a second embodiment of the present invention, as shown in FIG. 8, the visual element 42 judges whether the object 52, such as the hand of the user, is possible to enter the danger zone 33 according to the movement trajectory T of the object 52. If the object 52 is possible to enter the danger zone 33, the visual element 42 transmits a brake signal to the controller 44 to make the controller 44 control the power source 27 to stop operating through the brake 43.

For example, when the sawing process is performed, the hand of the user may need to adjust the position thereof constantly because of pushing the workpiece toward the processing member 28. During the adjustment, the visual element 42 keeps capturing the position of the hand, and determines the position the hand may then arrive according to the related information such as the moving direction and the moving speed of the hand. If the visual element 42 determines that the follow-up position of the hand may be in the danger zone 33, the visual element 42 sends a brake signal to the controller 44, as shown in FIG. 7, to make the controller 44 control the power source 27 to stop operating through the brake 43.

In summary, the safety module 40 of the present invention uses the visual element 42 to judge whether the object 52 is located in the danger zone 33 or possible to enter the danger zone 33, and uses the controller 44 to control the power source 27 to stop operating through the brake 43, so as to prevent the object 52 from being cut by the processing member 28, thereby attaining the objective of improving the operation safety. However, it should be additionally mentioned that the safety module 40 of the present invention may be modularized to be used in coordination with different processing machines, such as turning machine, drilling machine, milling machine or sawing machine like miter saw, band saw, tile saw, metal cutting saw, table saw or circular saw, as long as the processing machine in coordination therewith is structurally arranged with a processing member for performing a processing to a workpiece and a power source for driving the processing member.

What is claimed is:

1. A safety module for a processing machine, the processing machine comprising a processing member and a power source connected with the processing member, the safety module comprising:

a visual element for defining a safety zone and a danger zone for a processing scope of the processing member;

a brake for being connected with the power source; and a controller for being connected with the power source and electrically connected with the visual element and the brake;

wherein when a specific target is recognized by the visual element, the visual element transmits a start signal to the controller to make the controller control the power source to start up; when the visual element captures that an object is located in the danger zone, the visual element transmits a brake signal to the controller to make the controller drive the brake to control the power source to stop operating.

2. The safety module as claimed in claim 1, wherein the specific target is a biometric or a non-biometric.

3. The safety module as claimed in claim 1, wherein when the visual element captures that the object is located in the safety zone, the visual element transmits an operate signal to the controller to make the controller control the power source to continue operating.

4. The safety module as claimed in claim 1, wherein the danger zone is defined around the processing member and right in front of the processing member by the visual element.

* * * * *